United States Patent [19]

Bunyan

[11] 4,120,230

[45] Oct. 17, 1978

[54] SELF-STRAINING BOLTS

[75] Inventor: Thomas Walter Bunyan, London, England

[73] Assignee: Pilgrim Engineering Developments Limited, London, England

[21] Appl. No.: 771,092

[22] Filed: Feb. 23, 1977

[51] Int. Cl.² .................... F16B 31/04; B23P 11/02
[52] U.S. Cl. ................................ 85/1 T; 29/252; 29/446; 254/29 A
[58] Field of Search ............... 85/1 T, 1.5, 32 T, 62; 254/29 A, 93 R, 93 A; 29/252, 452, 446

[56] References Cited

U.S. PATENT DOCUMENTS

| | | | |
|---|---|---|---|
| 2,359,046 | 9/1944 | Miller | 85/1 T |
| 3,679,173 | 7/1972 | Sherrick et al. | 254/29 A |
| 3,772,759 | 11/1973 | Bunyan | 29/252 |
| 3,835,523 | 9/1974 | Stansfield | 85/1 T X |
| 3,841,193 | 10/1974 | Ito | 85/1 T X |
| 3,886,707 | 6/1975 | Heldt | 85/1 T X |
| 3,947,948 | 4/1976 | Fredriksson et al. | 254/29 A X |

FOREIGN PATENT DOCUMENTS 1,197,413   7/1970   United Kingdom ............. 85/1 T

*Primary Examiner*—Ramon S. Britts
*Attorney, Agent, or Firm*—Woodcock, Washburn, Kurtz & Mackiewicz

[57] ABSTRACT

A self-straining bolt comprises a hollow shank having a flanged and screw-threaded head at one end, a core member, a rod within the shank and secured to the other end of the shank a nut in screw-threaded engagement with the core bears against the shank at the said one end. The bolt is tensioned by means of a tensioning head comprising two coaxial jacking means, one for tensioning the hollow shank by bearing on the core member and the other for tensioning the core member by bearing on the shank head.

14 Claims, 1 Drawing Figure

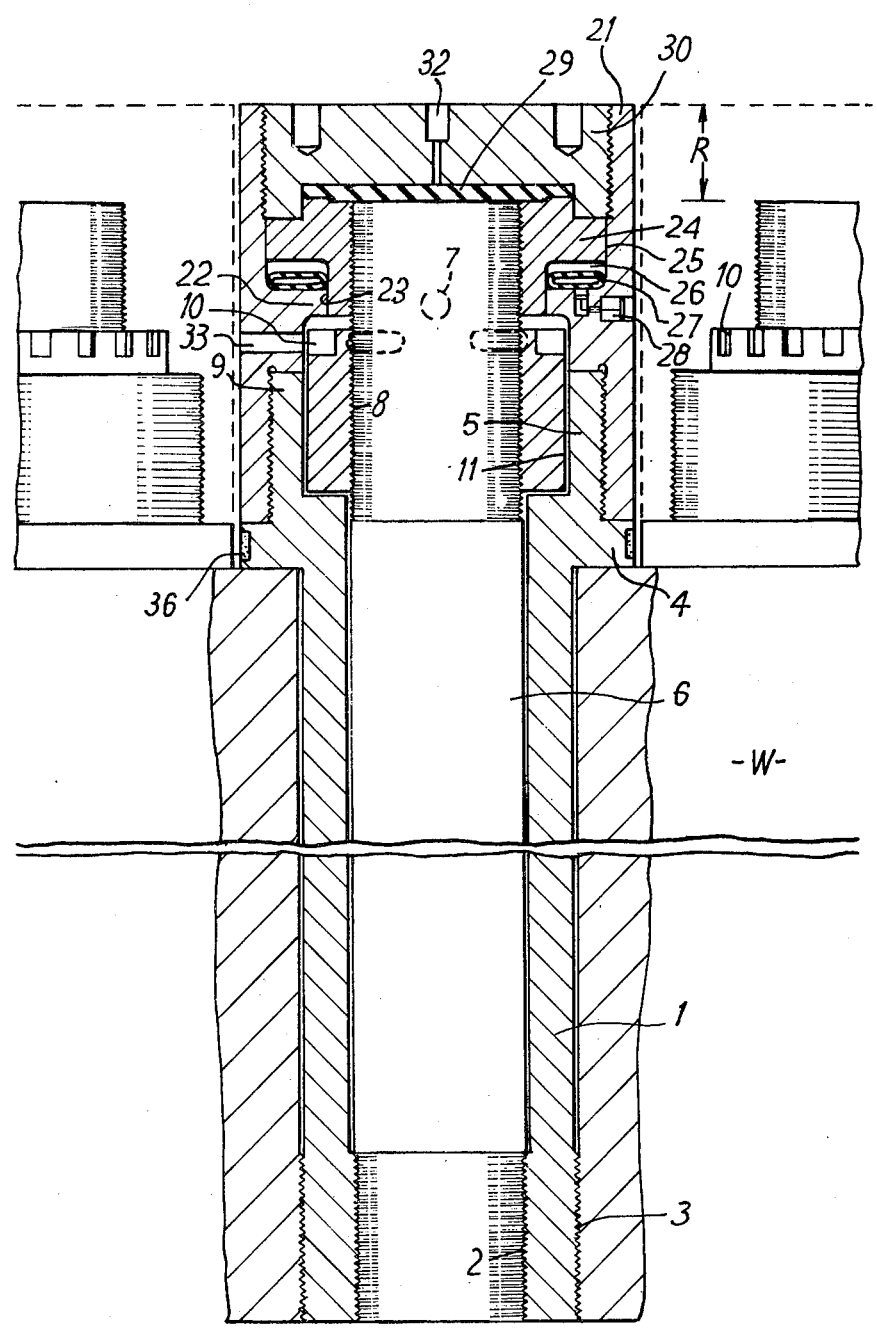

SELF-STRAINING BOLTS

BACKGROUND OF THE INVENTION

The present invention relates to improvements in self-straining bolts.

Self-straining bolts are known for example from British patent specification No. 1,382,192 which shows a bolt having a central bore which is closed at one end. The bolt is stressed by inserting a rod along the bore into contact with the closed end and applying jacking forces, at the opposite end of the bolt, between the bolt and rod in such a manner as to tension and stretch the shank of the bolt and apply a corresponding compression force to the rod. The clearance created by stretching the bolt is taken up by shims or adjustment of a nut and the jacking forces are then relieved, leaving the bolt under tension. The rod may then be removed.

OBJECT OF THE INVENTION

An object of the invention is to provide a self-straining bolt construction in which substantially the entire cross-section of the bolt is solid and under tension and which may be tensioned by a tensioning head which is not required to bear against the work in which the bolt is being installed. It is further desirable that the tensioning head should not project laterally beyond the outer perimeter of the area of pressure-transmitting contact between the bolt and the work.

BRIEF DESCRIPTION OF THE INVENTION

According to the present invention there is provided a compound bolt comprising a hollow shank and a core member within the shank, the shank and core member being secured to each other at or adjacent a first end of the bolt assembly, releasable transfer means at or adjacent the second end of the assembly for transferring tension forces from the core member to the hollow shank, the core member being capable of withstanding in compression the normal tensile force generated in the shank in use when such force is transferred thereto by the transfer means and having coupling means at or adjacent the second end for applying tensile and compressive forces to the core member.

Also according to the present invention there is provided a method of establishing a tensioned compound bolt connection between two spaced regions comprising the steps of pre-tensioning a hollow bolt shank by pre-compressing a core member in the shank, positioning the shank and core member assembly in the required position for the bolt connection without end play; releasing the pre-compression in the core member, whereby the pre-tension of the hollow shank is applied between the two regions, applying tension to the core member by exerting reaction against the shank, creating a play-free force transmitting path between the two ends of the tensioned core member and corresponding ends of the hollow shank, and releasing the tension applied externally to the core member so that the tension in the core member is applied in the direction compress the shank.

By making use of the invention, it is possible to establish a high tension bolted connection by using bolt tightening devices which do not project beyong the circumscribed cylinder around the head or load transmitting flange of the bolted connection. This arrangement is particularly desirable with large highly-stressed closely-pitched bolts or studs used for example in securing the casings of large steam turbines which operate at high temperatures. The present method of tightening such bolts is by thermal means in which the bolt or stud is rapidly elongated by inserting an electrical heating element into a centrally drilled hole in the core of the bolt or stud.

When the bolt has increased its length by the required amount, the nut is secured down and measurements made through the centrally drilled hole indicate the true extension achieved in the bolt or stud and hence the true tension achieved in the bolt or stud. However, this method is time-consuming and there is always a danger that the rapid heating from the core of the bolt or stud will cause cracking due to plastic deformation of the bolt material resulting from the very high termal stress gradients which such heating causes. To achieve uniform tightening around a complete turbine casing, it is often necessary to repeat this time-consuming operation two or three times on each bolt or stud.

The present invention avoids the need for any thermal stressing of the bolts or studs but instead makes use of hydraulic stressing techniques (which have been proved by wide experience in other fields) while at the same time, avoiding the need for any equipment of greater diameter than the head of the bolt or stud which is to be tightened.

DESCRIPTION OF THE DRAWING

An embodiment of the invention will now be described by way of example with reference to the accompanying drawing in which the single figure shows one compound bolt together with tensioning apparatus therefor in axial section and the two adjacent bolts in elevation.

DESCRIPTION OF THE PREFERRED EMBODIMENT

In the following description and in the claims, reference is made to "compound bolts"; it will of course be understood that this term is used generically for the sake of simplicity and will include compound studs where appropriate.

The compound bolt shown in the drawing comprises a hollow tubular shank 1 which is both internally and externally screw-threaded at its first or lower end at 2 and 3 respectively and has an integral circular flange 4 which forms the base of an externally screw-threaded head portion 5 for the bolt.

A core member in the form of a solid rod 6 has its lower end screw-threaded and in tight engagement with the threads 2 at the lower end of the hollow shank 1. The rod 6 is somewhat longer than the shank 1 so that it projects above the top of the head 5 and the upper end portion of the rod above the flange 4 is screw-threaded at 8 and has engaged thereon a cylindrical nut 9 the upper part of which projects above the head 5 and is formed with blind castellations 10 while the lower part of the nut 9 is received in a counterbore 11 in the shank head 5.

The tensioning apparatus for the compound bolt comprises a generally cylindrical housing 21 the lower end of which is internally screw-threaded to engage with the external threads on the shank head 5. The diameter of the head 21 is equal to the diameter of the shank head flange 4.

An internal flange 22 extends inwards from the housing 21 to make sliding contact with cylindrical surface 23 on a combined piston and nut 24 which has internal screw-threads engaged on the upper part of the threads 8 on the rod 6 and has its external cylindrical surface 25 in sliding contact with the inner wall surface of the housing 21 above the flange 22. There is thus defined an annular chamber 26 containing a tire or load-cell 27 made of nitrile rubber which has a connection 28 for receiving a high pressure hydraulic supply.

The top surface of the radially inner part of the piston nut 24 is substantially flush with the top surface of the rod 6 and the two form a seating for a diaphragm 29 which may be formed by a stack of thin discs of nitrile rubber. An end cap 30 has external screw-threads engaged in internal screw-threads in the upper part of the housing 21 and has a central connector 32 for delivering high pressure hydraulic fluid to the upper side of the diaphragm 29.

At the level of the blind castellations or notches 10, the housing 21 is formed with horizontal arcuate slots 33 through which a suitable tommy-bar or the like can be inserted to engage the notches 10 for manipulation of the nut 9.

Installation and fitting of each compound bolt are as follows:

Before installation in the work W, the compound bolt is preassembled and pre-tensioned in the workshop. First, the rod 6 is screwed firmly home by means of its screw-threads into the screw-threads 2 in the lower part of the shank 1. The nut 9 is then engaged on the screw-threads 8 on the upper part of the rod 6.

Next the pressure head cylinder 21 complete with the nitrile load cell 27 and pressure connection 28 is firmly screwed down onto the bolt flange face 4. The nut 24 is now screwed home until the upper surface is flush with the end of rod 6, a micrometer depth reading $R_1$ between the upper lip of the pressure head cylinder 21 and the top surface of the rod 6 is taken to provide a datum.

The nitrile rubber diaphragm 29 is then inserted and the top plate 30 is screwed home firmly. A hydraulic pressure of 35,000 p.s.i. is now applied through connector 32 elongating the bolt shank 1 and reducing its diameter. The isolating valve (not shown) is closed, trapping the hydraulic pressure within the head. The bolt is now screwed into place in the work W as shown, being nipped up by a hammer and metal drift engaged in appropriate notches 36 in the flange 4. The isolating valve is opened-releasing the hydraulic pressure and the top plate 30 and the nitrile diaphragm 29 are removed. A repeat of this micrometer reading $R_2$ will give the actual value of the bolt as $R_2$-$R_1$.

If, as in the case of the drawing, a ring of bolts is being installed, it may be desired that the final tensioning operation on a plurality of bolts should take place simultaneously. For this purpose, all connections 32 of individual tensioning heads for each of the bolts to be simultaneously tensioned are connected together as are the connections 28. Then, the isolating valve controlling all the connectors 32 is opened simultaneously releasing the pressure as a result of which the shank 1 contact in length thereby applying a uniform load to the work W. The micrometer depth gauge readings for each bolt should then be taken again and recorded after checking that they are within prescribed limits.

The or each isolator valve connection is then removed from the connector 32 and applied to the connector 28 and the top plate 30 and nitrile diaphragm 29 are also removed. The high working pressure of about 35,000 p.s.i. is then applied to pressurise the annular pressure cell or tyre 27 thereby stretching the rod 6.

The micrometer depth gauge reading R is again taken ($R_3$) and the tension in rod 6 is represented by $R_3$-$R_2$. With the hydraulic pressure maintained at the working pressure, each nut 9 is screwed down on the threads 8 into contact with the bottom of the counterbore 11 by hand, using a suitable tommy-bar engaged through the slots 33 into the notches 10.

By releasing the pressure in the load cells 27, the load which was transmitted by the load cells is now transmitted through the nuts 9 again to the heads 5 and flanges 4 of the bolt shanks. A further micrometer reading ($R_4$) will indicate whether there has been any loss of tightening strain when the load is transferred to nut 9. The loss should in fact be not more than one thousandth of an inch if the unit has been adequately nipped up and there are normal machining errors on the screw-threads and the mating faces of unit and landing.

The or each tensioning head may now be removed by disconnecting the hydraulic pipe from the connection 28 by unscrewing them, unscrewing the piston nut 24 and then finally unscrewing the outer casing 21 from the bolt head 5.

Removal of a bolt is effected by re-assembling the tensioning head onto the head 5 of the bolt in question, applying the high loading fluid pressure to the load cell or tyre 27, unscrewing the nut 9 by hand by means of the tommy-bar passed through the slots 33 until the nut 9 touches the underside of the piston nut 24, applying the high fluid pressure through the connector 32 and thereafter closing the isolator valve, using the hammer and drift to slacken off the bolt by means of the notches 36, completely unscrewing the bolt in question and removing the bolt and tensioning head assembly for further work as required.

As can be clearly seen in the drawing, the housings 21 of the tensioning heads do not come into contact with the work W and are situated within the imaginary circumscribing cylinder of the flanges 4. As a result of nominal clearance only is required between adjacent flanges 4 and tensioning head housings 21.

It will be noted that the assembly comprising the shank 1 and the rod 6 are fully loaded to a high level of controlled stress.

I claim:

1. A compound bolt comprising a hollow shank, a core member within the hollow shank, the shank and core member being secured to each other against relative axial movement in both directions at or adjacent a first end of the bolt assembly, releasable transfer means at or adjacent the second end of the assembly for transferring tension forces from the core member to the hollow shank, the core member being capable of withstanding in compression the normal tensile force generated in the shank in use when such force is transferred thereto by the transfer means, and coupling means at or adjacent the second end of the core member for applying tensile and compressive forces to the core member.

2. A compound bolt according to claim 1, wherein the releasable transfer means comprises a nut in screw-threaded engagement with either the shank or the core member, the nut being rotatable into abutting contact with a shoulder on the core member or shank.

3. A compound bolt according to claim 2, wherein the nut is in screw-threaded engagement with the threaded portion of the core member and the threaded portion projects beyond the nut, when the latter is in contact with the shoulder on the shank, by a sufficient amount to form coupling means for applying tensile force to the core member.

4. A compound bolt according to claim 2, wherein the nut projects beyond the end of the hollow shank for engagement by an adjusting tool.

5. A compound bolt according to claim 1, wherein the shank has an externally screw-threaded surface at or adjacent the second end for engagement by a tensioning head.

6. A compound bolt according to claim 5, wherein the second end of the shank has a flange for engaging a workpiece and the screw-threaded surface of the shank lies beyond the flange and is of smaller diameter than the flange.

7. A compound bolt according to claim 1, wherein the shank is maintained pre-tensioned and the core maintained pre-compressed by a force transmitted therebetween through the transfer means.

8. A method of establishing a tensioned compound bolt connection between two spaced regions comprising the steps of pre-tensioning a hollow bolt shank by pre-compressing a core member in the shank, positioning the shank and core member assembly in the required position for the bolt connection without end play; and releasing the pre-compression in the core member, whereby the pre-tension of the hollow shank is applied between the two regions, characterised by applying tension to the core member by exerting reaction against the shank, creating a play-free force transmitting path between the two ends of the tensioned core member and corresponding ends of the hollow shank, and releasing the tension applied externally to the core member so that the tension in the core member is applied spontaneously upon such release in the direction of the shank such as to compress the shank.

9. In combination a tensioning head and a self-straining bolt assembly, said bolt assembly comprising a hollow shank, a core member within the shank, the shank and core member being secured to each other against relative axial movement and said tensioning head comprising jacking means connectable to the shank and adapted to apply jacking forces to the end of the core member, characterised in that said compound bolt assembly includes a nut or the like for transferring tensile stresses in the core member to the shank, and in that said head includes further jacking means connectable with the core member to act between the core member and shank to thereby apply jacking forces to stretch the core member relative to the shank.

10. The combination according to claim 9, wherein the core jacking means comprises a sleeve having an internal flange, a piston having an external flange slidably received in the sleeve and defining in the sleeve a closed annular chamber, the piston being engageable with the coupling means on the core, and a toroidal flexible walled tube in the annular chamber and connected to a source of fluid pressure.

11. The combination according to claim 9 in which said shank has a flange for engaging a workpiece and a screw-threaded surface lying beyond the flange and of smaller diameter than the flange, and said jack has an internally screw-threaded sleeve adapted to couple onto the screw-threaded surface of the shank, and the external diameter of said sleeve is no greater than that of the flange of the shank.

12. The combination according to claim 9 in which the body of the head is apertured to provide access for a tool engageable with the nut or the like for adjusting the angular position thereof.

13. The combination according to claim 9 wherein the body of the jack has an internal abutment surface for engagement by the transfer means to retain the pre-compression of the core member when the jacking forces are released.

14. The combination according to claim 10 in which the core is externally screw-threaded adjacent the tensioning head, wherein the outer surface of the piston is adapted to form a radial extension of the end surface of the core and the shank tensioning jacking means includes a diaphragm having its outer margin clamped between the outer surface of the piston and an end cap detachably secured in the body of the tensioning head to bound a fluid pressure chamber on the opposite side of the diaphragm from the core.

* * * * *